US010592792B2

(12) United States Patent
Thams et al.

(10) Patent No.: US 10,592,792 B2
(45) Date of Patent: Mar. 17, 2020

(54) SYSTEMS AND METHODS FOR BARCODE TRANSLATION

(71) Applicant: Handle Financial, Inc., Sunnyvale, CA (US)

(72) Inventors: Kurt Torben Thams, Santa Cruz, CA (US); John Paul Minor, Freehold, NJ (US); Stephen Capps, San Carlos, CA (US); Daniel Jeffrey Shader, Palo Alto, CA (US); Richard Scott Perkins, Eagle, ID (US)

(73) Assignee: Handle Financial, Inc., Sunnyvale, CA (US)

( * ) Notice: Subject to any disclaimer, the term of this patent is extended or adjusted under 35 U.S.C. 154(b) by 1061 days.

(21) Appl. No.: 14/307,609

(22) Filed: Jun. 18, 2014

(65) Prior Publication Data

US 2014/0297441 A1  Oct. 2, 2014

Related U.S. Application Data

(63) Continuation-in-part of application No. 14/212,655, filed on Mar. 14, 2014, now abandoned, and a
(Continued)

(51) Int. Cl.
*G06Q 30/00* (2012.01)
*G06F 17/00* (2019.01)
(Continued)

(52) U.S. Cl.
CPC ....... *G06K 19/06028* (2013.01); *G06Q 20/14* (2013.01); *G06Q 20/20* (2013.01);
(Continued)

(58) Field of Classification Search
CPC .............................................. G06K 19/06028
(Continued)

(56) References Cited

U.S. PATENT DOCUMENTS

| 4,799,156 A | 1/1989 | Shavit et al. |
| 5,056,019 A | 10/1991 | Schultz et al. |

(Continued)

FOREIGN PATENT DOCUMENTS

| EP | 1174811 | 1/2002 |
| EP | 2187349 | 5/2010 |

(Continued)

OTHER PUBLICATIONS

MODASolutions (2007) "A Look at How Online Bill Payment Changes the eCommerce Landscape" A MODASolutionsTM White Paper, pp. 1-14.

(Continued)

*Primary Examiner* — Sun M Li
(74) *Attorney, Agent, or Firm* — Hall Estill Attorneys at Law; Gordon R. Lindeen III

(57) ABSTRACT

Disclosed herein are systems and methods for converting barcodes to facilitate fast and convenient payments. In one embodiment, the systems and methods are for imaging a first barcode having a first barcode format; determining a second barcode format used at a point-of-service; converting the first barcode to a second barcode in the second format; and generating an image of the second barcode. In another embodiment, a service provider barcode-conversion system receives with a communications interface an image of a first barcode having a first barcode format from a customer; determines with a processor a second barcode format used at a point-of-service; generates with the processor an image of a second barcode in the second barcode format; generates with the processor a link between the first barcode and the second barcode; stores in memory the first barcode, the second barcode, and the link between the first barcode and second barcode; and transmits with the communications interface the image of the second barcode to the customer.

20 Claims, 6 Drawing Sheets

Related U.S. Application Data continuation-in-part of application No. 13/087,271, filed on Apr. 14, 2011, now abandoned.

(51) Int. Cl.
*G06K 19/06* (2006.01)
*G06Q 20/20* (2012.01)
*G06Q 20/36* (2012.01)
*G06Q 20/38* (2012.01)
*G06Q 20/14* (2012.01)
*G06Q 20/24* (2012.01)
*G06Q 30/06* (2012.01)
*G06Q 40/08* (2012.01)
*G06Q 20/40* (2012.01)
*G06Q 30/02* (2012.01)
*G06Q 20/32* (2012.01)

(52) U.S. Cl.
CPC ........... *G06Q 20/206* (2013.01); *G06Q 20/24* (2013.01); *G06Q 20/3274* (2013.01); *G06Q 20/3276* (2013.01); *G06Q 20/3674* (2013.01); *G06Q 20/385* (2013.01); *G06Q 20/40* (2013.01); *G06Q 30/0253* (2013.01); *G06Q 30/06* (2013.01); *G06Q 40/08* (2013.01)

(58) Field of Classification Search
USPC ........................... 705/23, 24; 235/375
See application file for complete search history.

(56) References Cited

U.S. PATENT DOCUMENTS

| | | | |
|---|---|---|---|
| 5,308,119 A | 5/1994 | Roshkoff | |
| 5,310,997 A | 5/1994 | Roach et al. | |
| 5,336,870 A | 8/1994 | Hughes et al. | |
| 5,577,109 A | 11/1996 | Stimson et al. | |
| 5,594,226 A | 1/1997 | Steger | |
| 5,721,768 A | 2/1998 | Stimson et al. | |
| 5,924,080 A | 7/1999 | Johnson | |
| 5,956,694 A | 9/1999 | Powell | |
| 5,970,470 A | 10/1999 | Walker et al. | |
| 6,055,516 A | 4/2000 | Johnson et al. | |
| 6,070,798 A | 6/2000 | Nethery | |
| 6,141,653 A | 10/2000 | Conklin et al. | |
| 6,185,545 B1 | 2/2001 | Resnick et al. | |
| 6,260,024 B1 | 7/2001 | Shkedy | |
| 6,266,647 B1 | 7/2001 | Fernandez | |
| 6,356,878 B1 | 3/2002 | Walker et al. | |
| 6,381,582 B1 | 4/2002 | Walker et al. | |
| 6,450,407 B1 | 9/2002 | Freeman et al. | |
| 6,484,182 B1* | 11/2002 | Dunphy | G06F 17/30958 700/231 |
| 6,581,827 B2 | 6/2003 | Welton | |
| 6,736,314 B2 | 5/2004 | Cooper et al. | |
| 6,745,022 B2 | 6/2004 | Knox | |
| 6,837,426 B2 | 1/2005 | Tidball et al. | |
| 6,938,013 B1 | 8/2005 | Gutierrez-Sheris | |
| 6,961,858 B2* | 11/2005 | Fransdonk | G06F 21/10 380/281 |
| 6,971,574 B1 | 12/2005 | Herskowitz | |
| 7,006,983 B1 | 2/2006 | Packes, Jr. et al. | |
| 7,042,992 B1 | 2/2006 | Falcone | |
| 7,020,635 B2* | 3/2006 | Hamilton | G06Q 20/00 705/51 |
| 7,035,813 B1 | 4/2006 | Cook | |
| 7,080,049 B2* | 7/2006 | Truitt | G06Q 20/16 380/30 |
| 7,090,128 B2* | 8/2006 | Farley | H04L 67/2823 235/384 |
| 7,107,462 B2* | 9/2006 | Fransdonk | G06Q 20/12 380/282 |
| 7,150,045 B2* | 12/2006 | Koelle | G06F 21/552 380/201 |
| 7,243,839 B2 | 7/2007 | Beck et al. | |
| 7,257,545 B1* | 8/2007 | Hung | G06Q 30/02 705/14.26 |
| 7,290,704 B1 | 11/2007 | Ball et al. | |
| 7,293,109 B2 | 11/2007 | Maximilian | |
| 7,296,003 B2 | 11/2007 | Mersky et al. | |
| 7,344,067 B2 | 3/2008 | Beck et al. | |
| 7,386,485 B1 | 6/2008 | Mussman et al. | |
| 7,422,153 B2 | 9/2008 | Cai | |
| 7,587,502 B2* | 9/2009 | Crawford | A63F 13/12 463/42 |
| 7,611,051 B1 | 11/2009 | Beck et al. | |
| 7,620,606 B2* | 11/2009 | Gentry | G06Q 20/02 380/277 |
| 7,640,193 B2 | 12/2009 | Crespo et al. | |
| 7,711,586 B2* | 5/2010 | Aggarwal | G06Q 10/02 700/14 |
| 7,711,639 B2 | 5/2010 | Reid et al. | |
| 7,729,984 B1 | 6/2010 | Nappi | |
| 7,783,571 B2 | 8/2010 | Fish et al. | |
| 7,797,192 B2 | 9/2010 | Mitchell et al. | |
| 7,904,385 B2 | 3/2011 | Bishop et al. | |
| 7,949,600 B1 | 5/2011 | Portillo et al. | |
| 8,060,382 B1 | 11/2011 | Lee et al. | |
| 8,140,381 B1 | 3/2012 | Wu et al. | |
| 8,282,001 B2 | 10/2012 | Snyder et al. | |
| 8,321,342 B2* | 11/2012 | Marshall | G06Q 20/10 705/35 |
| 8,371,502 B1 | 2/2013 | Galit et al. | |
| 8,392,208 B1 | 3/2013 | Klieman et al. | |
| 8,605,094 B1 | 12/2013 | Alfaro et al. | |
| 8,651,374 B2 | 2/2014 | Brabson et al. | |
| 8,681,741 B1 | 3/2014 | Ngo et al. | |
| 2001/0032182 A1 | 10/2001 | Kumar et al. | |
| 2001/0042042 A1 | 11/2001 | Stokes et al. | |
| 2002/0002537 A1 | 1/2002 | Bastiansen | |
| 2002/0010600 A1 | 1/2002 | Fujita | |
| 2002/0013768 A1 | 1/2002 | Ganesan | |
| 2002/0077978 A1 | 6/2002 | O'Leary et al. | |
| 2002/0147689 A1 | 10/2002 | Falkner | |
| 2002/0152163 A1 | 10/2002 | Bezos et al. | |
| 2002/0153410 A1 | 10/2002 | Santini | |
| 2002/0161644 A1 | 10/2002 | Duffield | |
| 2002/0161721 A1 | 10/2002 | Yuan et al. | |
| 2002/0188559 A1 | 12/2002 | Schultz | |
| 2002/0195486 A1 | 12/2002 | Erb et al. | |
| 2003/0046223 A1 | 3/2003 | Crawford et al. | |
| 2003/0061162 A1 | 3/2003 | Matthews | |
| 2003/0149632 A1 | 8/2003 | Walker et al. | |
| 2003/0154165 A1 | 8/2003 | Horn et al. | |
| 2003/0220862 A1 | 11/2003 | Kilgore et al. | |
| 2004/0024701 A1 | 2/2004 | Hansen et al. | |
| 2004/0024707 A1 | 2/2004 | Perre et al. | |
| 2004/0030647 A1 | 2/2004 | Hansen et al. | |
| 2004/0035922 A1 | 2/2004 | Cameron | |
| 2004/0133515 A1 | 7/2004 | McCoy et al. | |
| 2004/0139009 A1 | 7/2004 | Kozee et al. | |
| 2004/0185869 A1 | 9/2004 | Lee et al. | |
| 2004/0210476 A1 | 10/2004 | Blair et al. | |
| 2004/0249705 A1 | 12/2004 | Spencer et al. | |
| 2004/0251309 A1* | 12/2004 | Cove | G06K 19/12 235/493 |
| 2005/0029354 A1* | 2/2005 | Frantz | G06K 19/06009 235/462.01 |
| 2005/0108104 A1 | 5/2005 | Woo | |
| 2005/0125345 A1 | 6/2005 | Miller et al. | |
| 2005/0137970 A1 | 6/2005 | Houle et al. | |
| 2005/0182684 A1 | 8/2005 | Dawson et al. | |
| 2005/0256806 A1 | 11/2005 | Tien et al. | |
| 2005/0283448 A1* | 12/2005 | Dixon | G06F 17/30879 705/408 |
| 2006/0054695 A1 | 3/2006 | Owada | |
| 2006/0136301 A1 | 6/2006 | Grovit | |
| 2006/0167791 A1 | 7/2006 | Hahn-Carlson | |
| 2006/0173776 A1 | 8/2006 | Shalley et al. | |
| 2006/0253335 A1 | 11/2006 | Keena | |
| 2007/0016523 A1 | 1/2007 | Blair et al. | |
| 2007/0016526 A1 | 1/2007 | Hansen et al. | |

(56) References Cited

U.S. PATENT DOCUMENTS

| | | |
|---|---|---|
| 2007/0022058 A1 | 1/2007 | Labrou et al. |
| 2007/0038516 A1 | 2/2007 | Apple et al. |
| 2007/0130028 A1 | 6/2007 | Provinse |
| 2007/0150411 A1 | 6/2007 | Addepalli et al. |
| 2007/0150414 A1 | 6/2007 | Templeton |
| 2007/0174082 A1 | 7/2007 | Singh |
| 2007/0181691 A1* | 8/2007 | Chang .............. G06F 17/30879 235/462.41 |
| 2007/0225912 A1 | 9/2007 | Grush |
| 2007/0252696 A1 | 11/2007 | Belisle et al. |
| 2008/0021841 A1 | 1/2008 | Rau et al. |
| 2008/0040233 A1 | 2/2008 | Wildman et al. |
| 2008/0097904 A1 | 4/2008 | Volchek et al. |
| 2008/0162345 A1 | 7/2008 | Passanha |
| 2008/0215475 A1 | 9/2008 | Ramer et al. |
| 2008/0217392 A1* | 9/2008 | Weiner .................... G06K 7/14 235/375 |
| 2008/0275811 A1 | 11/2008 | Koningstein et al. |
| 2008/0301047 A1 | 12/2008 | Fish et al. |
| 2008/0319869 A1 | 12/2008 | Carlson et al. |
| 2009/0012862 A1 | 1/2009 | Pirillo et al. |
| 2009/0017798 A1 | 1/2009 | Pop |
| 2009/0048886 A1 | 2/2009 | Bishop et al. |
| 2009/0055266 A1 | 2/2009 | Brody et al. |
| 2009/0108080 A1* | 4/2009 | Meyer .................... G06Q 20/14 235/494 |
| 2009/0112662 A1 | 4/2009 | Mullen et al. |
| 2009/0112760 A1 | 4/2009 | Johnson et al. |
| 2009/0150290 A1 | 6/2009 | Szrek et al. |
| 2009/0157566 A1 | 6/2009 | Grush |
| 2009/0187492 A1 | 7/2009 | Hammad et al. |
| 2009/0204522 A1 | 8/2009 | Johnh |
| 2009/0222317 A1 | 9/2009 | Allen et al. |
| 2009/0228336 A1 | 9/2009 | Giordano et al. |
| 2009/0234746 A1 | 9/2009 | Jensen et al. |
| 2009/0240594 A1 | 9/2009 | Kerner et al. |
| 2009/0254381 A1 | 10/2009 | Frederickson et al. |
| 2009/0313109 A1 | 12/2009 | Bous et al. |
| 2009/0327133 A1 | 12/2009 | Aharoni et al. |
| 2010/0005025 A1 | 1/2010 | Kumar et al. |
| 2010/0017279 A1 | 1/2010 | Connor, Jr. |
| 2010/0138344 A1 | 6/2010 | Wong et al. |
| 2010/0145723 A1 | 6/2010 | Hudson et al. |
| 2010/0174646 A1 | 7/2010 | Cole et al. |
| 2010/0191578 A1 | 7/2010 | Tran et al. |
| 2010/0205167 A1 | 8/2010 | Tunstall-Pedoe et al. |
| 2010/0223182 A1 | 9/2010 | Battaglini |
| 2010/0257081 A1 | 10/2010 | Ritchie |
| 2010/0268821 A1 | 10/2010 | Pau et al. |
| 2010/0276484 A1 | 11/2010 | Banerjee et al. |
| 2010/0332265 A1 | 12/2010 | Smith |
| 2011/0125561 A1 | 5/2011 | Marcus |
| 2011/0131118 A1 | 6/2011 | Srinivasan et al. |
| 2011/0145145 A1 | 6/2011 | Battaglini et al. |
| 2011/0208550 A1 | 8/2011 | Lamarche et al. |
| 2011/0208641 A1 | 8/2011 | Shader et al. |
| 2011/0208642 A1 | 8/2011 | Shader et al. |
| 2011/0213699 A1 | 9/2011 | Johnson |
| 2011/0225067 A1 | 9/2011 | Dunwoody |
| 2011/0238474 A1 | 9/2011 | Carr et al. |
| 2011/0258122 A1 | 10/2011 | Shader et al. |
| 2011/0258686 A1 | 10/2011 | Raj et al. |
| 2011/0276474 A1 | 11/2011 | Portillo et al. |
| 2012/0005075 A1 | 1/2012 | Bulawa et al. |
| 2012/0030110 A1 | 2/2012 | Prakash et al. |
| 2012/0041877 A1 | 2/2012 | Rao |
| 2012/0066081 A1 | 3/2012 | Shader et al. |
| 2012/0072346 A1 | 3/2012 | Barkan Daynovsky et al. |
| 2012/0084178 A1 | 4/2012 | Ehbauer et al. |
| 2012/0129552 A1 | 5/2012 | Skybey |
| 2012/0130797 A1 | 5/2012 | Shin |
| 2012/0166314 A1 | 6/2012 | Kimberg |
| 2012/0179558 A1 | 7/2012 | Fischer |
| 2012/0185317 A1 | 7/2012 | Wong |
| 2012/0209767 A1 | 8/2012 | Battaglini et al. |
| 2013/0006785 A1 | 1/2013 | Perkins et al. |
| 2013/0030995 A1 | 1/2013 | O'Leary et al. |
| 2013/0041741 A1 | 2/2013 | Shader et al. |
| 2013/0046691 A1 | 2/2013 | Culton |
| 2013/0080239 A1 | 3/2013 | Okerlund |
| 2013/0124410 A1 | 5/2013 | Kay et al. |
| 2013/0138563 A1 | 5/2013 | Gilder et al. |
| 2013/0166398 A1 | 6/2013 | Minde |
| 2014/0012688 A1 | 1/2014 | McGuinness et al. |
| 2014/0052654 A1 | 2/2014 | Curetti et al. |
| 2014/0095267 A1 | 4/2014 | Argue et al. |
| 2014/0108201 A1 | 4/2014 | Frechette et al. |
| 2014/0122337 A1 | 5/2014 | Kang |
| 2014/0279111 A1 | 9/2014 | Mahaffey et al. |
| 2014/0279509 A1 | 9/2014 | Khilnani et al. |

FOREIGN PATENT DOCUMENTS

| | | |
|---|---|---|
| GB | 2359652 | 2/2000 |
| JP | 2001/109835 | 4/2001 |
| JP | 2001/325468 | 11/2001 |
| KR | 10-2006-0125667 | 12/2006 |
| WO | WO-2008/018052 | 2/2008 |
| WO | WO-2010/040206 | 4/2010 |

OTHER PUBLICATIONS

"Cash payment comes to internet retailing." Accessed at http://www.internetretailer.com/internet/marketing conference/56525-cash-payment-come. Jun. 18, 2009. (pp. 1-2).

"Amazon debuts Honor System." Accessed at http://news.cnet.com/2100-1017-252122.html. Feb. 6, 2001. (pp. 1-4).

"Amazon Payments Account Management." Accessed at http://payments.amazon.com/sdui/sdui/business? sn=devfps/marketplace. Jun. 18, 2009. (pp. 1-4).

White, Ron, "How Computers Work", Millennium Ed, Que Corporation, Indianapolis, IN, 1999.

"PayNearMe at Finovate 2010" retrieved on May 7, 2015 from https://www.youtube.com/watch?v=d-oaZpCzpqk (Oct. 4-5, 2010; posted Nov, 5, 2010; see arrow on screen referring to the publication date of this electronic reference, the publication date of Nov. 5, 2010 being a date more than one year prior to the filing of the instant application: the Prese.

"Inside Redbox Mobile Demo" (Feb. 1, 2009), uploaded to YouTube by habdeira, retrieved on Sep. 12, 2012 from: http://www.youtube.com/watch?v=iroan2BtzDc (hereinafter "Redbox App").

"PCT Search Report and Written Opinion", PCT/US2013/041974, (dated Aug. 14, 2013), 11 pages.

Finovate Fall 2011 show of Sep. 20 & 21, 2011, https://www.youtube.com/watch?v=1YWrVuklp8k; uploaded on YouTube on Oct. 28, 2011.

Finovate Spring 2011 show of May 10 & 11, 2011, https://www.youtube.com/watch?v=8nA9Vd_3aKo; uploaded on YouTube on Jun. 24, 2011.

PayNearMe Demonstration http://www.paynearme.com/h_videos/greyhound-video which was accessible via a redirect from http://www.paynearme.com/greyhound as of Jul. 9, 2013, and uploaded to the www.paynearme.com website in Apr. 2012.

PayNearMe Demonstration Video; http://www.paynearme.com/greyhound; Apr. 2012.

"PayNearMe at FinovateFall 2010" retrieved on Sep. 12, 2012 from http://www.youtube.com/watch?v=d-oaZpCzpqk (Oct. 4-5, 2010; posted Nov. 5, 2010; the Presenters are: CEO Danny Shader and Named inventor John Minor; also found on Assignee's website of www.paynearme.com, retrieved from: http://liveweb.archive.org/http://www.paynearme.com/consumers).

Coggins, Wynn W. (2002). Prior Art in the Field of Business Method Patents—When is an Electronic Document a Printed Pubiication for Prior Art Purposes? Presented at AIPLA, Fall 2002; www.USPTO.gov.

Plymouth, K. & Martin, J. (2009). Bill Payment Trends: Major Shifts in Consumer Behavior Require Comprehensive Planning. A First Data White Paper.

(56) References Cited

OTHER PUBLICATIONS

Rao, L. (2010), PayNearMe Launches Cash Payment System With 7-Eleven; Signs Up Amazon, Facebook. Disrupt, TechCruch.
Credit Card Processing Blog (Aug. 12, 2010), How to Manage 'Non-Matching Account Number' Chargebacks (hereinafter "Credit Card Processing").
PayNearMe at FinovateFall 2010 (2010), uploaded to youtube.com on Nov. 5, 2010 (hereinafter PayNearMe2010).
Dealer Incentives, by Tim Gutowski, http://www.cars.com/go/advice/Story.jsp?section=inc&story=incDealer&subject=incent, verified by internet Archive WayBack Machine Apr. 27, 2005.
Channel Loyalty Program, htto://www.awards.co.za/what-we-do/sale-channel-incentive-programs/channel-loyalty-program/, Achievement Awards Group, verified by Internet Archive WayBack Machine May 12, 2013.
Dao et al. Location-Based services: technical and business issues. School of Surbeying and Spatial Information Systems, The University of New South Wales, Sydney, Australia, GPS Solutions (2002) 6: 169-178.

\* cited by examiner

Figure 3

SYSTEMS AND METHODS FOR BARCODE TRANSLATION

This application is a continuation-in-part of application Ser. No. 13/087,271, filed Apr. 14, 2011, and also a continuation-in-part of application Ser. No. 14/212,655, filed Mar. 14, 2014.

SUMMARY

The present invention relates to systems and methods for converting barcodes to facilitate fast and convenient payments. Specifically, presented herein are systems and methods for imaging a first barcode having a first barcode format; determining a second barcode format used at a point-of-service; converting the first barcode to a second barcode in the second format; and generating an image of the second barcode.

BRIEF DESCRIPTION OF THE FIGURES

Together with this written description, the figures further serve to explain the principles of, and to enable a person skilled in the relevant art, to make and use the claimed systems and methods.

FIG. 3 is an example of a bill with a barcode.

DETAILED DESCRIPTION

Figure 1:
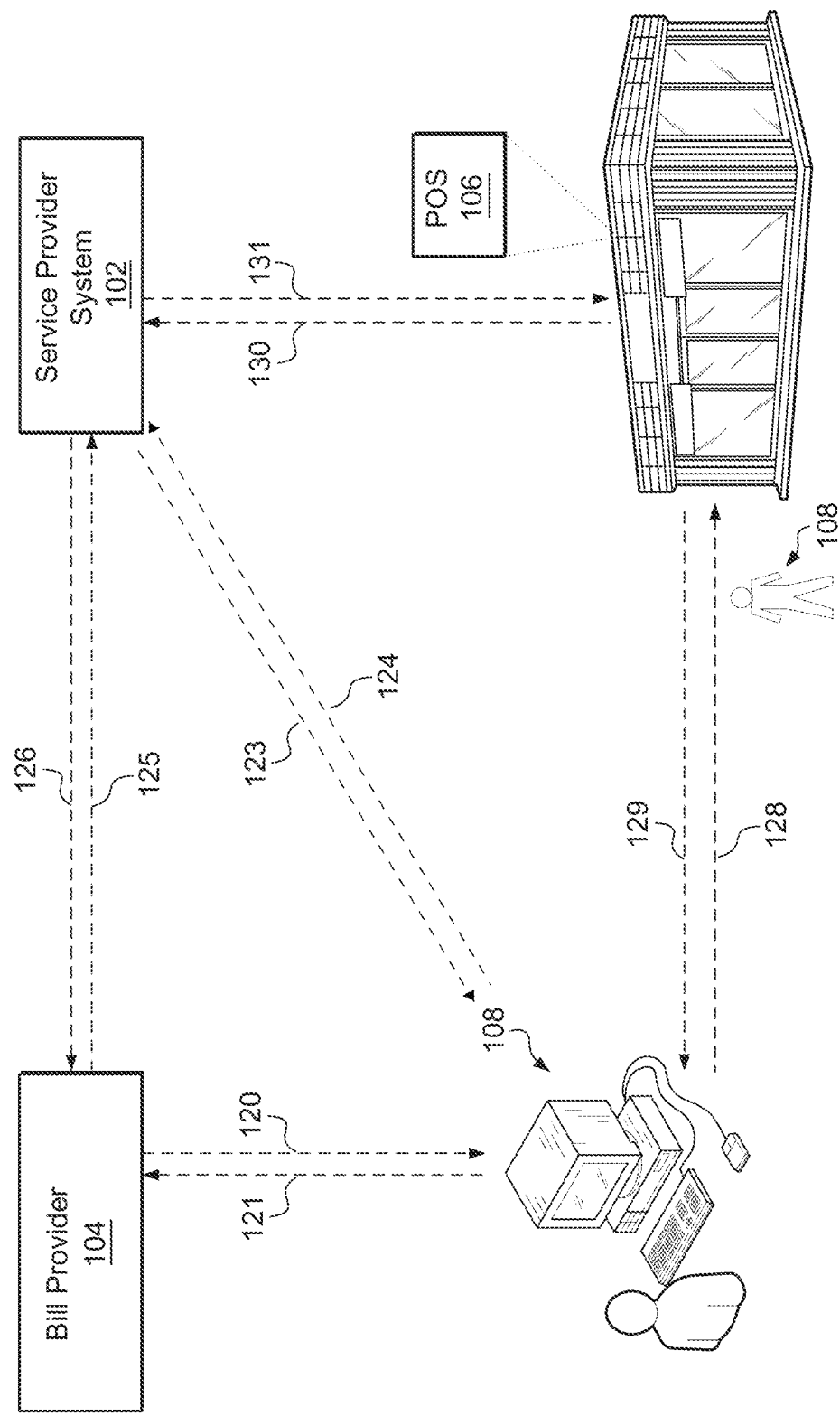
FIG. 1 is a high-level flow process chart illustrating the relationships between the parties involved in the presented systems and methods.

Advancements in technology are increasingly changing the way consumers pay for goods and services, including the way customers pay their bills. For bill payments, many customers are turning to electronic payments instead of cash. Moreover, many payees such as utilities encourage their customers to use electronic payments to improve security and reduce paperwork. Several forms of electronic payment have been developed and are in use. For example, many customers use credit cards or electronic checks (e.g., e-checks) to pay bills. In the case of a credit card payment, the purchaser typically provides a credit card number and security code associated with an account to be charged. In the case of payment via an electronic check, a purchaser typically provides an American Bankers Association (ABA) routing number, and account number associated with an account to be charged. These methods of electronic payment are typically backed by a financial institution, such as a bank, that pays the retailer and extends credit to the purchaser or debits a monetary amount from the purchaser's account. Thus, the billing company secures payment from the financial institution prior to providing an item, and the purchaser is obligated to reimburse the financial institution. Alternatively, many customers pay bills using personal checks or with on-line bill payment services. These services are also typically provided by a financial institution such as a bank.

Electronic payments, checks, and on-line bill payments are often provided without any face-to-face interaction between the retailer and the customer. And although electronic payments, checks, and on-line bill payments may be available to some customers, other customers may not have access to these forms of payment. For example, individuals with no credit-cards or bank accounts may not be able to provide these forms of payment. Further, some people may not trust the available forms of electronic payments, checks, or on-line bill payments for fear of fraud, identity theft, or the like. A customer who does not have access to, or does not trust the traditional forms of bill payment, may rely on other forms of payment, such as mailing in cash or a money order or traveling to the nearest office for the billing company.

But many billing companies discourage cash payments. And traveling to the nearest office of the billing company is often impractical or very difficult and time-consuming. In addition to causing problems for bill payers, these issues may discourage prompt and full payment of bills by customers who would otherwise have paid if given a more-convenient payment method. And the delay caused by mailing a payment or traveling to an office of a billing company can cause late payments with accompanying accounting problems for the billing company and late charges for the customer.

The present invention relates to systems and methods to facilitate fast and safe cash payments that overcome many of the difficulties of the current systems. Specifically, the present invention provides systems and methods for facilitating easy and efficient cash payments, including for paying bills. The following is a description of one or more embodiments of the present invention, with reference to FIGS. 1-6. The present invention is not limited to the particular embodiments described, and the terminology used herein is for the purpose of describing particular embodiments only.

FIG. 1 is a high-level flow illustration, showing exemplary relationships between the parties involved in the presented systems and methods. In this example, four parties are involved: (1) a service provider having a service provider system 102; (2) a payee 104; (3) a point-of-service ("POS") 106; and (4) a customer 108. The dashed lines in FIG. 1 generally represent a flow of information, data, or process or interaction between respective parties. In practice, the dashed lines in FIG. 1 may represent user interfaces and/or application program interfaces (APIs) for the transmission of information, data, instructions, funds, etc. The flow of information, data, or process between the respective parties may be direct or may flow through systems or parties not shown in FIG. 1.

In a scenario consistent with FIG. 1, a customer 108 wants to make a cash payment for a bill the customer received from a payee 104. Making a cash payment to the payee 104 may be logistically difficult because the payee 104 is remote from the customer 108 or because the payee 104 does not accept cash payments. The service provider system 102 exchanges information with the customer 108 and/or the payee 104. These exchanges are represented by lines 120-121 and 123-126. Based on these exchanges, the service provider system 102 provides a token to the customer 108 directly or indirectly (e.g., through the payee 104). The customer 108 presents the token and a payment at the point-of-service 106. This is shown as line 128. The point-of-service 106 communicates with the service provider system 102 to notify the service provider system 102 of the presentment of the token and payment and to transmit funds to the service provider system 102. The interaction between the point-of-service 106 and the service provider system 102 are shown as lines 130 and 131. The point-of-service 106 may interact with the customer 108 including by providing information, merchandise, or a token to the customer 108. This interaction is shown as line 129.

The customer 108 may receive the token, for example, by mail, on a computer or mobile device. When the customer 108 wants to make a payment to the payee 104, the customer 108 takes the token to point-of-service 106 and makes a payment. After the customer 108 presents the token at the point-of-service 106, the point-of-service sends a confirmation that the customer presented the token and a payment having a payment amount at the point-of-service. The payment amount is the amount that the customer 108 presented to the point-of-service 106 with the token. The service provider system 102 receives the confirmation that the customer 108 presented the token and payment to the point-of-service 106. The service provider system 102 may send information to the point-of-service 106 in response to the information sent from the point-of-service 106, including an authorization to accept payment from the customer 108.

The service provider system 102 also receives a portion of the payment amount received at the point-of-service 106 from the customer 108. The amount received by the service provider system 102 may depend on the agreements between the service provider, the payee, and the point-of-service. For example, the amount received by the service provider system 102 may be less than the amount the customer 108 presented to the point-of-service 106 if, for example, the point-of-service 106 retains some of the payment. Alternatively, the amount received by the service provider system 102 may be more than the amount the customer 108 presented to the point-of-service 106 if, for example, the point-of-service 106 pays the service provider to increase traffic to the point-of-service.

The service provider, the payee, and the point-of-service may use a convenience fee model in which a fee is typically visible to the customer. In a convenience fee model, the customer generally pays any extra costs for the convenience of conducting the transaction. The parties may also use a fixed or variable commission model in which the fee is typically not shown to the customer. In a fixed or variable commission model, costs are typically incurred by the payee 104. Variable commission can be established between one or more parties, and dependent on one or more factors. For example, a variable commission structure may call for percentages being paid by/to the payee 104 and/or the point-of-service 106.

The service provider system 102 also transmits a portion of the payment amount received and a portion of the customer information to the payee 104. The payee 104 uses the customer information that the service provider system 102 transmits to correlate the payment it receives with the customer 108. The amount received by the payee 104 may depend on the agreements between the service provider, the payee, and the point-of-service.

The systems and methods described above will not function properly if the bill does not contain a token or if the token provided on the bill is not compatible with the service provider system 102 or with the point-of-service 106 system. In these circumstances, the systems and methods of the present invention facilitate cash payments by translating information included in the bill into a barcode compatible with the service provider system 102 and a selected point-of-service 106.

One type of information that may be contained in bills is a NACHA Quick Response (QR) Code. NACHA (previously the National Automated Clearing House Association) manages the development, administration, and governance of the Automated Clearing House Network (ACH), the backbone for the electronic movement of money and financial transactions in the United States. Both the government and the commercial sectors use ACH payments, and businesses increasingly use ACH online to have customers pay, rather than via credit or debit cards. NACHA, together with the Federal Reserve, establishes the rules and regulations that govern the ACH network. In 2012, the ACH network processed an estimated 21 billion transactions with a total value of $36.9 trillion.

Figure 2:
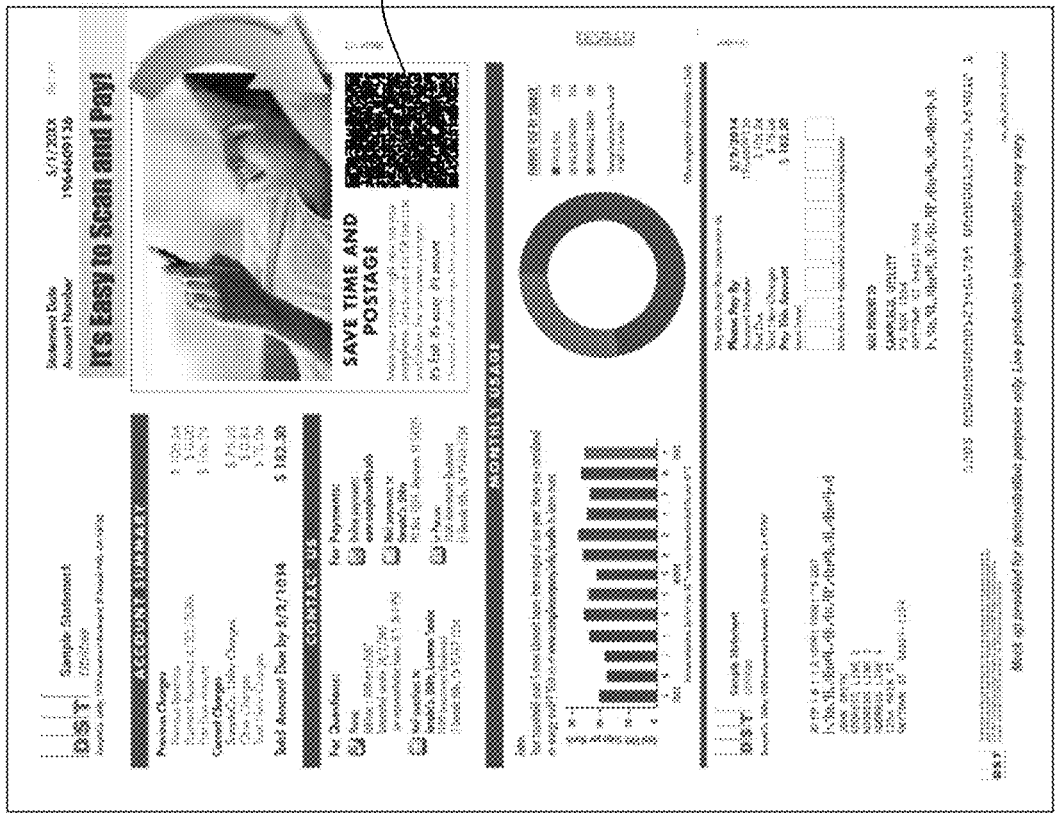
FIG. 2 is an example of a bill with a NACHA QR.

NACHA recently collaborated with its members to develop recommendations for consumer bill payment through QR Codes: the QR Encoding for Consumer Bill Pay Guidelines. The NACHA QR Guidelines describe the use of QR codes in a variety of bill payment functions such as viewing bills, making bill payments, enrolling for e-Bills and setting up payees in online banking. The NACHA QR Guidelines also establish standards for using QR codes in both biller direct and consolidator/aggregator billing and payment models and contain recommendations regarding QR code size, data to be included in the QR code, and layout of the data represented in the QR code, among others. Typical information in a NACHA QR Code includes: a biller URL, biller name, biller physical address, biller phone number, biller identification number, biller-defined fields, consumer account number, bill date, total amount due, minimum amount due, and due date. The intent of the NACHA QR Guidelines is to establish a single QR code format that can reach consumers wherever they view and pay bills. In this way, biller service providers can enable QR encoding in a standardized format providing certainty for biller and banking clients, and ensuring a consistent experience for consumers. FIG. 2 is an example of a bill 200 with a NACHA QR code 201.

Figure 3:
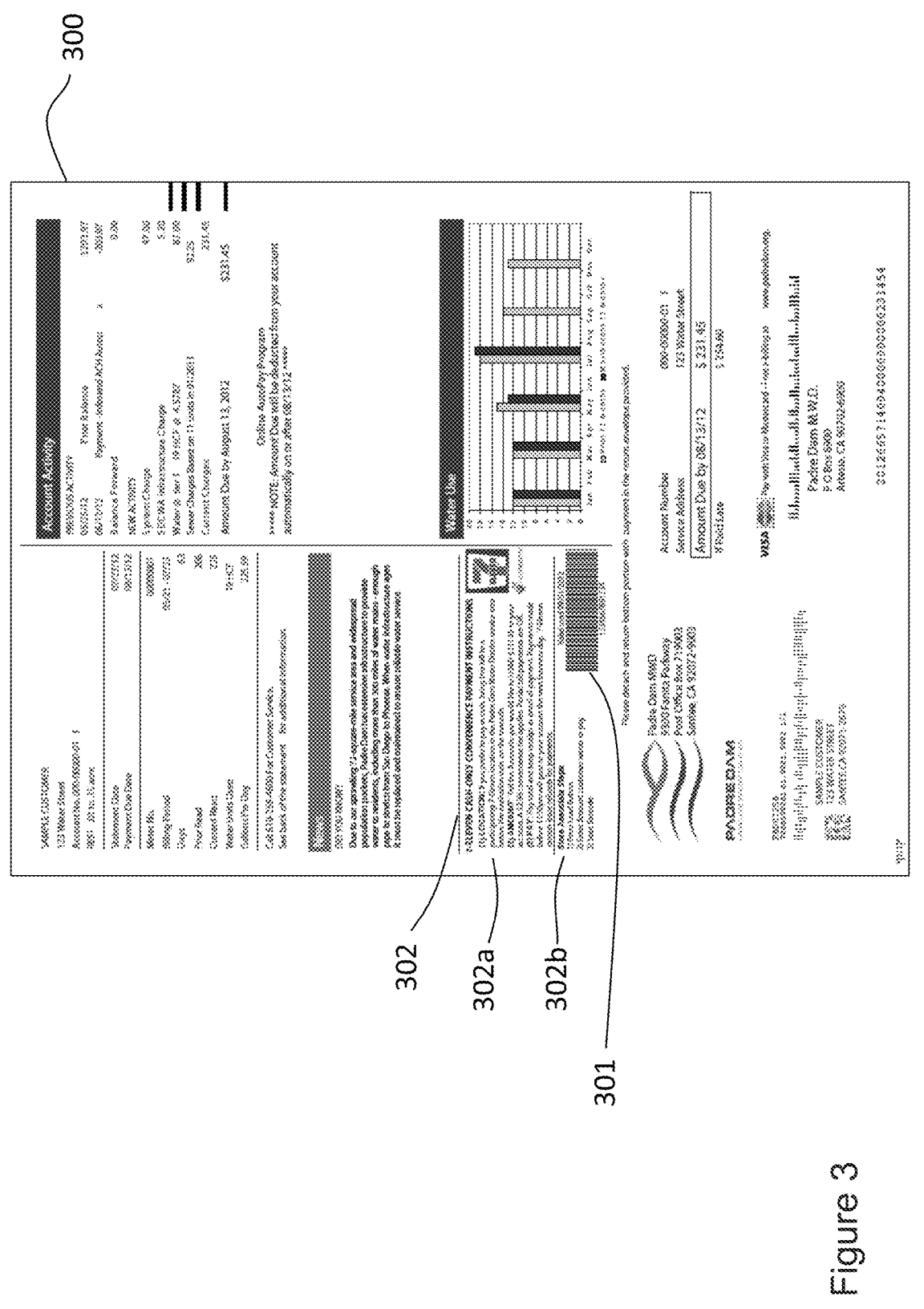

FIG. 3 is another example of a printed bill 300 that the payee 104 may provide to the customer 108. On the printed bill 300, there is a barcode 301. As shown in FIG. 3, the bill may also contain payment instructions 302. The payment instructions 302 may include instructions 302a for the customer and instructions 302b for the associate or clerk at the point-of-service 106. The payment instructions 302 are very important as the payment procedure may vary between different points-of-service. To ensure an efficient experience for both the customer and the clerk at the point-of-service, the instructions 302 may be selected for the specific point-of-service or type of point-of-service selected as the optimized payment location. As the example in FIG. 3 shows, the barcode 301 and instructions 302 may be specific to a point-of-service, 7-Eleven in this example.

The present invention provides efficient systems and methods of converting a barcode in a format specific to a first point-of-service into a barcode in a second format readable at a second point-of-service. For example, in one embodiment, the method comprises imaging the first barcode using the imaging system of a mobile device. The imaging system can be the camera of the device that, for example, takes a picture of the barcode on a bill. Alternatively, if the bill or payment file is on the mobile device, the imaging system could be a capture system that saves an image or copy of the barcode on the mobile device. This embodiment is useful for bills provided digitally directly to a mobile device.

Next the method includes determining a second barcode format used at a point-of-service. This step can include receiving an input identifying the point-of-service. For example, a customer may select a point-of-service on the mobile device. In the example of the NACHA QR code on a bill, the customer may select 7-Eleven as the desired barcode format. Alternatively, the method includes determining the second barcode format used at the point-of-service using geolocation information for the mobile device to identify the point-of-service. The geolocation information may include latitude and longitude, address information, coordinates, and the like. Also, the method may include determining the second barcode format used at the point-of-service using address information for a user of the mobile device to identify the point-of-service.

The method further includes converting the first barcode to a second barcode in the second format. Converting the first barcode to the second barcode in the second format may be done by decoding the first barcode to a data set then encoding the data set to the second barcode format and generating an image of the second barcode. The decoding, encoding, and image generation can be done on the mobile device or at a remote location including at the service provider system. For example, converting the first barcode to the second barcode in the second format may include transmitting an image of the first barcode to a service provider system, which decodes the barcode to a data set and encodes the data set into a barcode in the second format. The service provider system then sends an image of the second barcode to the mobile device that receives the image of the second barcode.

The method includes generating an image of the second barcode so that the barcode can be read with input equipment at the point of service. For example, if the point-of-service uses optical barcodes, the method includes generating an image of the second barcode in the optical format readable at the point-of-service. Alternatively, if the point-of-service uses magnetic readers, the method includes generating a magnetic image of the second barcode readable at the point-of-service.

Figure 4:
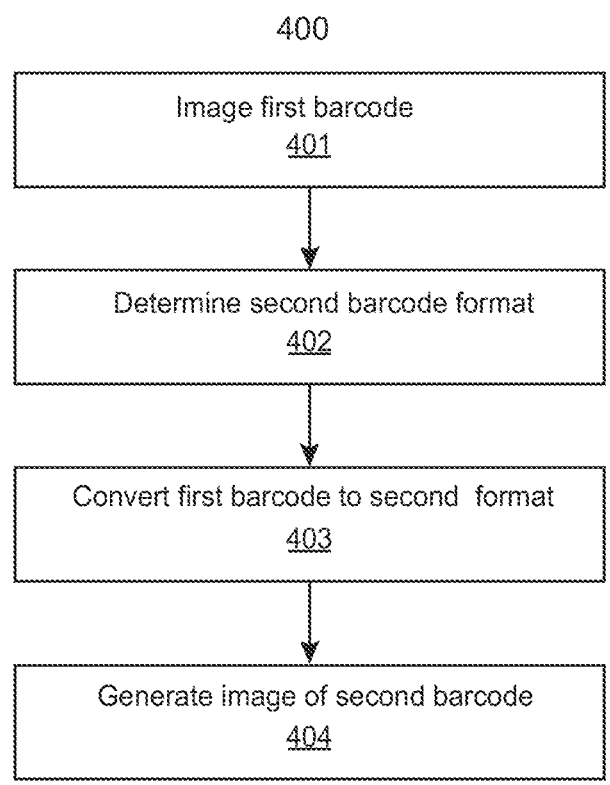
FIG. 4 is a high-level diagram illustrating one aspect of the present invention.

FIG. 4 is a high-level flowchart illustrating a method 400 for converting a barcode as described above. The method includes: 401 imaging the first barcode; 402 determining a second barcode format; 403 converting the first barcode into a barcode in the second format; and 404 generating an image of the barcode.

In another embodiment, a service provider system communications interface receives an image of a first barcode having a first barcode format from a customer. A processor of the service provider system determines a second barcode format used at a point-of-service. This step can include receiving an input identifying the point-of-service. For example, a customer may select a point-of-service on a mobile device. In the example of the NACHA QR code on a bill, the customer may select 7-Eleven as the desired barcode format. Alternatively, the method includes determining the second barcode format used at the point-of-service using geolocation information for the customer to identify the point-of-service. The geolocation information may include latitude and longitude, address information, coordinates, and the like. For example, the service provider system may determine the second barcode format used at the point-of-service using address information for the customer to identify the point-of-service.

Next, the processor of the service provider system generates an image of a second barcode in the second barcode format. The image of the second barcode can be read with input equipment at the point-of-service. For example, if the point-of-service uses optical barcodes, the method includes generating an image of the second barcode in the optical format readable at the point-of-service. Alternatively, if the point-of-service uses magnetic readers, the method includes generating a magnetic image of the second barcode readable at the point-of-service. After generating the image of the second barcode in the second formation, the processor of the service provider system generates a link between the first barcode and the second barcode. The service provider system then stores in memory the first barcode, the second barcode, and the link between the first barcode and second barcode. This link is important in this embodiment so that the service provider system can correlate payment received with the second barcode back to the payee information contained the first barcode. The communications interface of the service provider system then transmits the image of the second barcode to the customer.

Further, the processor of the service provider system determines payment information including a payee associated with the first barcode. This information is important so that the service provider system can transmit payment received from the customer to the payee. After the customer receives the second barcode, the customer takes the second barcode to the point-of-service and presents payment with the second barcode to a clerk at the point-of-service. The point-of-service reads the second barcode and transmits a confirmation that the customer presented the second barcode and a payment having a payment amount to the service provider system. The communications interface of the service provider system receives a confirmation that the customer presented the second barcode and a payment having a payment amount at the point-of-service. Next, the communications interface of the service provider system receives a first portion of the payment amount received at the point-of-service. Then the communications interface of the service provider system transmits a second portion of the payment amount received at the point-of-service to the payee. Thereby the payee may receive payment associated with the first barcode via a point-of-service that was unable to read the first barcode.

In one embodiment, the communications interface of the service provider system transmits the image of the second barcode to the customer before the processor of the service provider system determines the payment information associated with the first barcode. This example may improve the speed with which the customer receives the second barcode and may be important in cases in which determining the payment information associated with the first barcode takes a long time.

Figure 5:
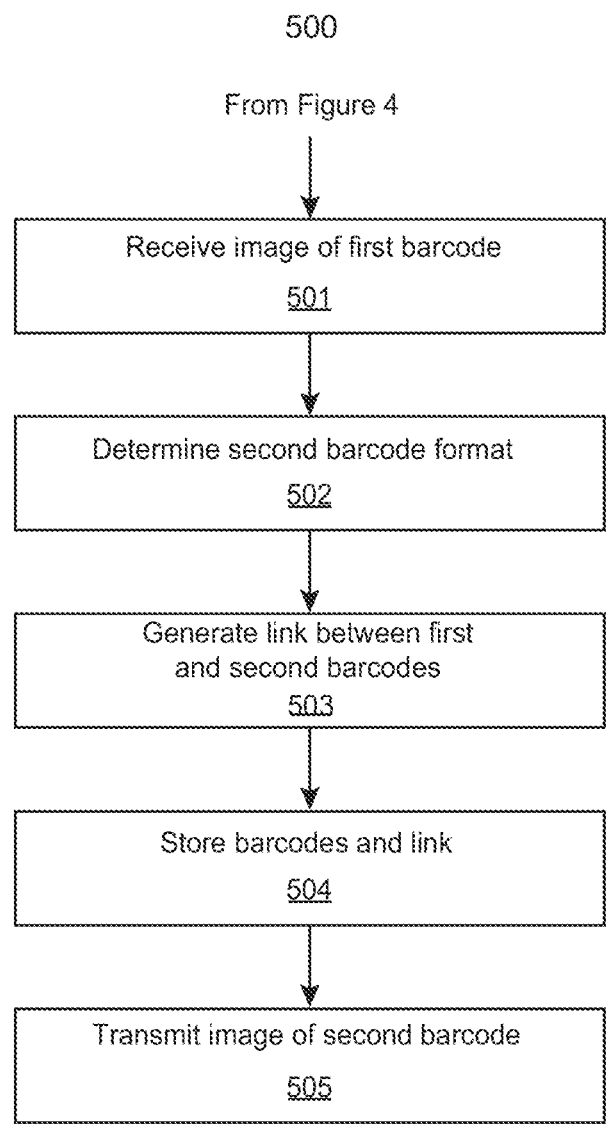
FIG. 5 is a high-level diagram illustrating one aspect of the present invention.

FIG. 5 is a high-level flowchart illustrating a method 500 for converting a barcode using a service provider system. The method includes the service provider system 102: 501 receiving an image of a first barcode having a first barcode format from a customer; 502 determining a second barcode format used at a point-of-service; 503 generating an image of a second barcode in the second barcode format; 504 generating a link between the first barcode and the second barcode; 505 storing the first barcode, the second barcode, and the link between the first barcode and second barcode; and 506 transmitting the image of the second barcode to the customer.

Figure 6:
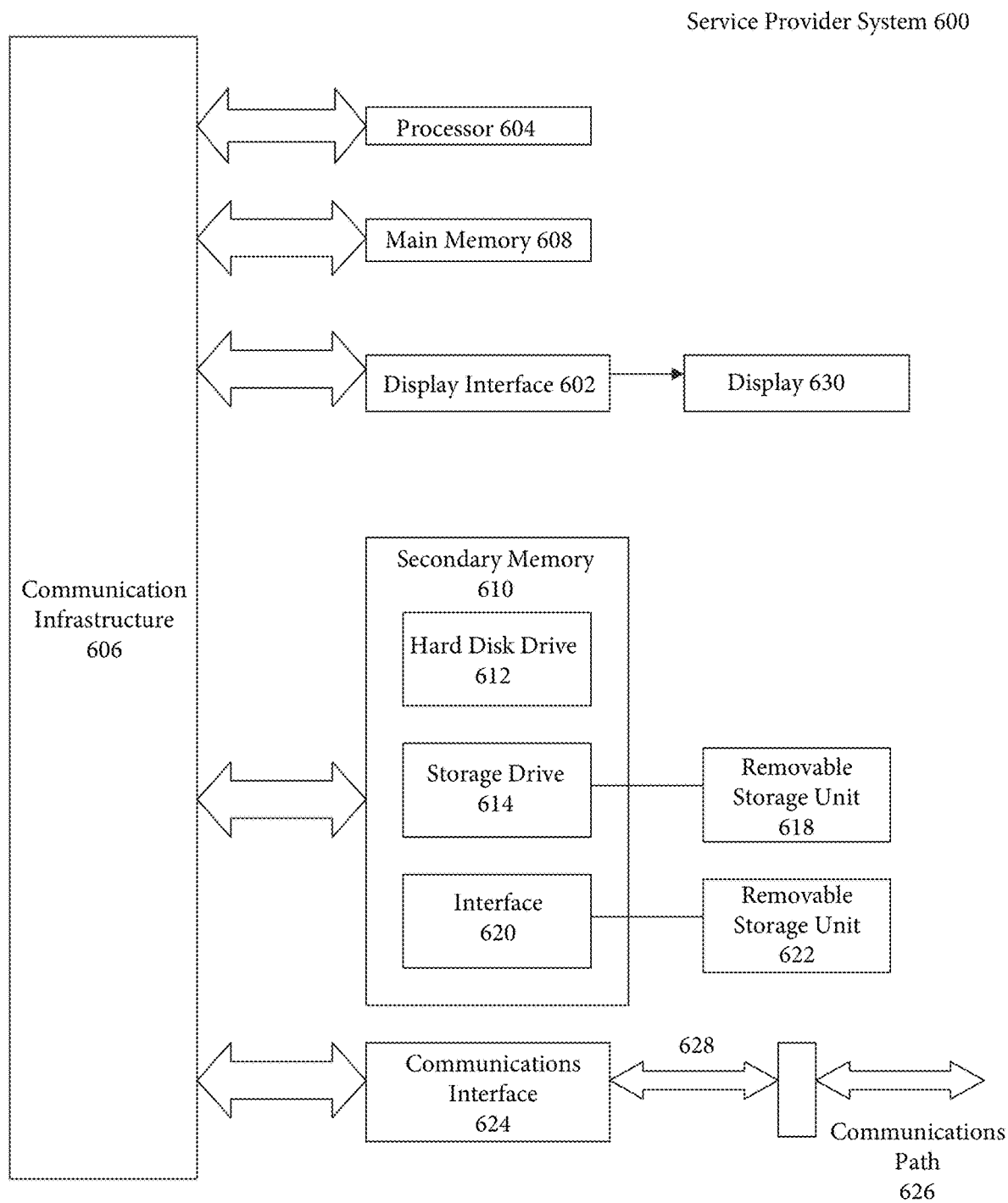
FIG. 6 is a schematic drawing of a service provider system of the present invention.

The service provider system 102 may comprise one or more computer systems capable of carrying out the functionality described herein. For example, FIG. 6 is a schematic drawing of a service provider system 600 used to implement the methods presented herein. Service provider system 600 includes one or more processors, such as processor 604. The processor 604 is connected to a communication infrastructure 606 (e.g., a communications bus, crossover bar, or network). Service provider system 600 can include a display interface 602 that forwards graphics, text, and other data from the communication infrastructure 606 (or from a frame buffer not shown) for display on a local or remote display unit 630.

Service provider system 600 also includes a main memory 608, such as random access memory (RAM), and may also include a secondary memory 610. The secondary memory 610 may include, for example, a hard disk drive 612 and/or a removable storage drive 614, representing a floppy disk drive, a magnetic tape drive, an optical disk drive, flash memory device, etc. The removable storage drive 614 reads from and/or writes to a removable storage unit 618. Removable storage unit 618 represents a floppy disk, magnetic tape, optical disk, flash memory device, etc., which is read by and written to by removable storage drive 614. The removable storage unit 618 includes a computer usable storage medium having stored therein computer software, instructions, and/or data.

In alternative embodiments, secondary memory 610 may include other similar devices for allowing computer programs or other instructions to be loaded into a service provider system 600. Such devices may include, for example, a removable storage unit 622 and an interface 620. Examples of such may include a program cartridge and cartridge interface (such as that found in video bill devices), a removable memory chip (such as an erasable programmable read only memory (EPROM), or programmable read only memory (PROM)) and associated socket, and other removable storage units 622 and interfaces 620, which allow computer software, instructions, and/or data to be transferred from the removable storage unit 622 to a service provider system 600.

Service provider system 600 may also include a communications interface 624. Communications interface 624 allows computer software, instructions, and/or data to be transferred between a service provider system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical, or other signals capable of being transmitted or received by communications interface 624. These signals 628 are provided to and from the communications interface 624 via a communications path (e.g., channel) 626. This channel 626 carries signals 628 and may be implemented using wire or cable, fiber optics, a telephone line, a cellular link, a radio frequency (RF) link, a wireless communication link, and other communications channels.

Computer programs (also referred to as computer control logic) are stored in main memory 608 and/or secondary memory 610. Computer programs may also be received via communications interface 624. Such computer programs, when executed, enable the service provider system 600 to perform the features of the present invention, as discussed herein. In particular, the computer programs, when executed, enable the processor 604 to perform the features of the presented methods. Accordingly, such computer programs represent controllers of the service provider system 600. Where appropriate, the processor 604, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into a service provider system 600 using removable storage drive 614, interface 620, hard drive 612, or communications interface 624. The control logic (software), when executed by the processor 604, causes the processor 604 to perform the functions and methods described herein.

In another embodiment, the methods are implemented primarily in hardware using, for example, hardware components such as application specific integrated circuits (ASICs) Implementation of the hardware state machine so as to perform the functions and methods described herein will be apparent to persons skilled in the relevant art(s). In yet another embodiment, the methods are implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

The figures included herein serve as embodiments of the presented systems and methods. Each individual process or sub-process performed within the embodiments described can be performed by one or more parties, as well as one or more computer systems. For example, in one embodiment, some or all of the communications and data transfers between payee, service provider system, and point-of-service are performed via an automated computer-based system, such as an application program interface. As such, the embodiments presented in the figures are not intended to be limiting.

What is claimed is:

1. An apparatus comprising:
    a service provider system communications interface to receive an image of a first barcode and a point-of-service identification from a mobile device, the first barcode having a first barcode format and representing a transaction with a party including a payee other than the service provider and the point-of-service, a first data set being encoded into the barcode that includes data regarding the transaction, wherein the first barcode format is not readable at the identified point-of-service; and
    a processor of the service provider system to determine that the first barcode format is not readable at the identified point-of-service, to determine a second barcode format that is readable at the identified point-of-service, to decode the encoded first data set of the first barcode, to generate a second barcode in the second barcode format, the second barcode representing the transaction, and to generate a stored link between the first barcode and the second barcode, the communications interface further to send the second barcode to the mobile device, to receive a confirmation from the identified point-of-service that a customer presented the second barcode and that the identified point-of-service read the second barcode and executed the proposed transaction using the second barcode, and to send the confirmation to the transaction party and a payment to the payee, wherein the processor of the service provider system correlates payment received with the second barcode back to the payee information contained in the first barcode through the stored link between the first barcode and the second barcode to determine the transaction party and the payee.

2. The apparatus of claim 1 wherein the point-of-service identification comprises a location of the mobile device.

3. The apparatus of claim 1 wherein the point-of-service identification comprises a user selection on the mobile device of a name of the identified point-of-service.

4. The apparatus of claim 1, wherein the processor generates an image of the second barcode and wherein the image is transmitted by the communications interface to the mobile device to be read by the identified point-of-service.

5. The apparatus of claim 1, wherein the processor of the service provider system stores the first barcode, the second barcode, and the link between the first barcode and second barcode in memory, wherein the link correlates execution of the proposed transaction with the second barcode back to data regarding the transaction party including the payee contained in the first barcode.

6. The apparatus of claim 1, wherein the confirmation indicates that the customer made a payment at the identified point-of-service.

7. The apparatus of claim 1, wherein sending the confirmation includes sending the first barcode.

8. The apparatus of claim 1, wherein generating the second barcode comprises converting the first barcode to a second barcode in the second barcode format by decoding the encoded first data set of the first barcode, then encoding the first data set to the second barcode format.

9. A method comprising:

receiving an image of a first barcode from a mobile device at a service provider system communications interface, the first barcode having a first barcode format and representing a transaction with a party including a payee other than the service provider, a first data set being encoded into the first barcode that includes data regarding the transaction;

receiving a point-of-service identification from the mobile device at the service provider system communications interface, wherein the point-of-service is not the payee;

determining by a processor of the service provider system that the first barcode format is not readable at the identified point-of-service;

determining by the processor of the service provider system a second barcode format that is readable at the identified point-of-service;

generating by the processor of the service provider system a second barcode in the second barcode format, the second barcode representing the proposed transaction;

generating by the processor of the service provider system a link stored at the service provider system between the first barcode and the second barcode;

sending the second barcode from the service provider system communications interface to the mobile device;

receiving at the service provider system a confirmation from the identified point-of-service that a customer presented the second barcode and that the identified point-of-service read the second barcode and executed the transaction using the second barcode;

correlating a payment received with the second barcode back to the payee information contained in the first barcode through the stored link between the first barcode and the second barcode to determine the transaction party and the payee by the processor of the service provider system;

the service provider system sending the confirmation from the service provider system to the transaction party; and the service provider system paying the payee.

10. The method of claim 9, further comprising generating an image of the second barcode by the processor of the service provider system and wherein sending the second barcode comprises sending the image to the mobile device to be read by the identified point-of-service.

11. The method of claim 9, further comprising:

storing the first barcode, the second barcode, and the link between the first barcode and the second barcode in memory, wherein the link correlates execution of the proposed transaction with the second barcode back to data regarding the parties to the proposed transaction contained in the first barcode.

12. The method of claim 9, further comprising:

transmitting a payment received at the point-of-service to the payee.

13. The method of claim 9, wherein sending the confirmation includes sending the first barcode.

14. The method of claim 9, wherein generating the second barcode comprises converting the first barcode to a second barcode in the second barcode format by decoding the encoded first data set of the first barcode, then encoding the first data set to the second barcode format.

15. A method comprising:

imaging a first barcode at a mobile device, the first barcode representing a transaction with a party including a payee other than the service provider, a first data set being encoded into the first barcode that includes data regarding the transaction;

identifying a point-of-service at the mobile device, wherein the point-of-service is not the payee;

sending the imaged first barcode and the point-of-service identification from the mobile device to a service provider system;

receiving a second barcode in a second barcode format from the service provider system at the mobile device, the second barcode representing the transaction and being linked at the service provider system to the first barcode, the first barcode format not being readable at the identified point-of-service and the second barcode format being selected by the processor of the service provider as being readable at the identified point-of-service; and executing the proposed transaction by the mobile device at the identified point-of-service by presenting the second barcode by the mobile device to the identified point-of-service for reading at the identified point-of-service and a payment to the point-of-service, wherein the service provider correlates payment received with the second barcode back to the payee information contained in the first barcode through the stored link between the first barcode and the second barcode to determine the transaction party and the payee and pays the payee upon receiving confirmation of the transaction execution from the point-of-service.

16. The method of claim 15, wherein the point-of-service is not identified in the encoded data set.

17. The method of claim 15, wherein imaging the first barcode comprises capturing an image of a printed barcode using an imaging system of the mobile device.

18. The method of claim 15, wherein imaging the first barcode comprises capturing an image displayed in a bill on a display of the mobile device.

19. The method of claim 15, wherein identifying a point of service comprises identifying a location of the mobile device and wherein sending the point-of-service identification comprises sending the mobile device location.

20. The method of claim 15, wherein executing the proposed transaction comprises presenting payment with the second barcode displayed on the mobile device by a customer to a clerk at the identified point-of-service, wherein the identified point-of-service reads the second barcode and transmits a confirmation that the customer presented the second barcode and payment to the service provider system.

\* \* \* \* \*